Oct. 19, 1954 R. W. KETCHLEDGE 2,692,307

TRANSMISSION REGULATION

Filed Feb. 19, 1952

INVENTOR
R. W. KETCHLEDGE
BY M. R. McKenney
ATTORNEY

Patented Oct. 19, 1954

2,692,307

UNITED STATES PATENT OFFICE 2,692,307

TRANSMISSION REGULATION

Raymond W. Ketchledge, Middlesex, N. J., assignor to Bell Telephone Laboratories, Incorporated, New York, N. Y., a corporation of New York Application February 19, 1952, Serial No. 272,461

6 Claims. (Cl. 179—175.3)

Figure 1:
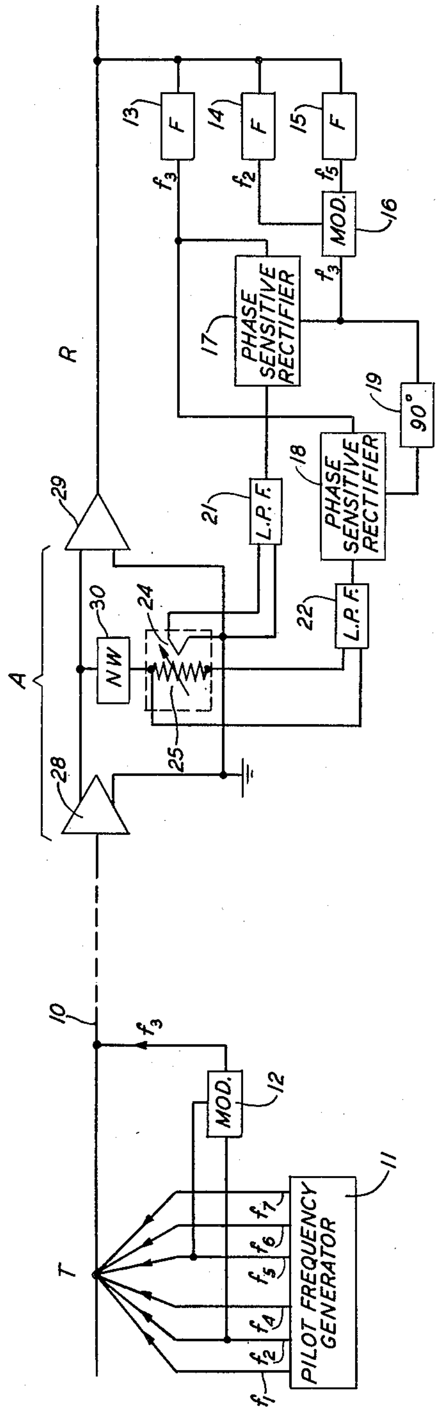

The invention relates to indication or measurement of electrical quantities and, in a typical application, to transmission measurement on a system, which may include automatic transmission regulation.

An object of the invention is to obtain effective attenuation measurement or gain regulation by use of a pilot wave of very low level and of very constant frequency.

A related object is to enable a low level pilot wave to be located in frequency close to signaling frequencies and still obtain adequate discrimination between pilot and signal energies to permit effective use of the pilot for measurement or control purposes.

A feature of the invention is a novel type of detecting or measuring circuit enabling vector addition of direct-current components.

The invention will be illustrated as applied to a coaxial line broad band system for television or multiplex carrier telephone transmission, by way of example. In such a system it is usual practice to locate pilot wave frequencies at different points in the transmission band so as to enable measurement and control of the flat gain, sloping gain, and other variables to whatever extent may be necessary to obtain the required kinds and degrees of compensation. It is assumed for purposes of present disclosure that it is desirable to locate one of these pilot frequencies quite near a signal channel frequency such as near the edge of the video band. In order to minimize disturbing effects between this pilot and the adjacent signal band, it is desirable to keep the level of this pilot wave relatively low. This creates a problem of detecting the pilot wave at a receiving point with sufficient discrimination against interferences which disturb the accuracy of detection. The solution of this problem in accordance with this invention involves two requirements: first that the frequency of the pilot wave be very accurately determined and second that adequate length of time be allowed within which to determine the strength of the received pilot wave. Very narrow band and hence long time-constant, filters can then be used.

In accordance with this invention the narrow band filter is a low pass filter used for the direct-current output of a rectifier and the accuracy of frequency determination is accomplished by deriving the pilot wave at the transmitter and a reference wave at the receiver by beating together waves having the same difference frequency in each case. Two phase-sensitive rectifiers are used at the receiving point, to which the reference wave is applied in quadrature phase relation and the received pilot in like phase. The resulting direct-current outputs are separated from other output products of the rectifiers by the low pass filters and are added in power, and the resultant may be used to measure line attenuation or to regulate the gain of a line amplifier.

The system as outlined above will be more fully described below in connection with the accompanying drawings showing in Fig. 1 a schematic diagram of the line including such parts of a sending and a receiving station as are necessary to an understanding of the invention and in Fig. 2 a modified type of receiving circuit that may be used for indicating or measuring purposes.

Referring to Fig. 1 numeral 10 indicates a broad band transmission line which may be typically of the coaxial type and is assumed to be used for transmission of multiplex telephone signals, video signals, or the like.

At the transmitting station T, a pilot frequency generator 11 is provided for generating in this case six pilot waves spaced in frequency over the transmission band, these being designated $f_1$, $f_2$, $f_4$, $f_5$, $f_6$ and $f_7$ respectively.

It is assumed to be desirable to provide an additional pilot wave having a frequency $f_3$ which may for example be located between $f_2$ and $f_4$ and to transmit this additional pilot wave over line 10 at low level.

The additional pilot wave of frequency $f_3$ is derived by intermodulating two appropriate pilot waves such as $f_2$ and $f_5$ in a suitable modulator 12 which produces the new wave of frequency $f_3$ as the difference frequency between the frequencies of two applied waves. Suitable filtering may be used to purify the wave of frequency $f_3$ before it is applied to the line. Also means (not shown) may be provided for determining its amplitude at the proper low level.

In order to detect the additional pilot wave of frequency $f_3$ at a receiving point R, narrow band filters 13, 14 and 15 are provided for picking off the three frequencies, $f_3$, $f_2$ and $f_5$, respectively. The waves from filters 14 and 15 are applied to a modulator 16 in order to derive the difference frequency wave $f_3$ for use at the receiver. This derived wave of frequency $f_3$ is applied to each of two phase sensitive rectifiers or detectors 17 and 18, respectively, which may comprise push-pull vacuum tube detectors or differential diode detectors, one example of which is shown in my prior Patent 2,434,273, issued January 13, 1948. A 90-degree phase shifter 19 is included between the output of modulator 16 and one only of the two phase sensitive detectors, e. g. detector 18. The received pilot wave of frequency $f_3$ is applied to the inputs of detectors 17 and 18 in the same phase.

Detectors 17 and 18 operate in the manner of class C modulators or detectors in that the derived or reference wave from the modulator 16 is applied to the detectors 17 and 18 at relatively large amplitude with respect to the amplitude of the pilot wave from filter 13. Under these conditions the reference wave causes the rectifiers or modulators 17 and 18 to operate as switches, the reference wave opening the switch when it has one polarity and closing the switch when it has the opposite polarity. If four detector elements are used in each rectifier as in my prior patent referred to, full wave rectification is obtained and the switching operation then resembles that of a double throw switch which is closed for transmission in one direction during one-half cycle of the applied reference wave and is closed for transmission in the reverse direction during the alternate half cycles of the reference wave. When the switch is in its closed position, it permits some of the received pilot wave of frequency $f_3$ from filter 13 to pass through the rectifier circuit thus producing in the output of each rectifier 17, 18, a direct current. The output of each rectifier will, of course, include many components of various frequencies representing products of modulation between any and all input waves, but the only direct current that is present is that which is produced by the intermodulation between the reference frequency wave and the wave of exactly the same frequency from filter 13. The magnitude of this direct current is proportional to the amplitude of the received pilot wave times the cosine of the phase angle between this pilot wave and the reference wave.

Since two phase-sensitive rectifiers or detectors 17 and 18 are used with the reference wave applied to them in phase quadrature, no necessary phase relation need exist between the waves applied to either, for the vector sum of the direct-current outputs from both detectors will always be directly proportional to the amplitude of the received pilot wave.

The rectified output from detector 17 is applied to a low pass filter 21, while a similar low pass filter 22 is supplied with the rectifier output of rectifier 18. It is a fairly simple matter to construct a low pass filter with very low cut-off of the order of, for example, one cycle or less per second, by using large series resistances and large shunt condensers. The filters 21 and 22 are constructed in this or in any other suitable manner to have the necessary low cut-off frequency to transmit a very narrow band so as to provide the required discrimination against interfering waves.

In accordance with the invention the vector addition of the two direct currents in the output of filters 21 and 22, respectively, is obtained by converting each current into power (in the form of heat) and then directly adding the two powers. By way of example, as shown in Figs. 1 and 2, the output current from filter 21 is passed through a heater element 24 which is mounted in heat transfer relation to a thermistor element 25. The direct-current output from filter 22 is applied across the terminals of the thermistor element 25 to produce direct heating of the element.

The use that is illustrated for the thermistor in Fig. 1 is in connection with the control of the gain of a line amplifier A which includes stages 28 and 29 and an interstage circuit including a network 30 and the thermistor element 25. This arrangement corresponds to that shown in Fig. 4 of K. C. Black Patent 2,111,607, issued March 22, 1938, and the amplifier A herein may be considered to be the same as that of the Black patent except for the manner in which the pilot wave is derived from the line and applied to the thermistor element for controlling the gain.

If the reference wave and pilot wave applied to one of the detectors 17 and 18 happen to be exactly in phase, the output direct current will be a maximum for a given amplitude of pilot wave. If the two waves are in 90-degree phase displaced relation, the output direct current is zero. If the direct-current output of one detector has the magnitude $E \sin \theta$, where E is the maximum amplitude of the voltage of the received pilot wave, and angle $\theta$ is the phase angle between the two applied waves, the direct-current output of the other detector will have the magnitude $E \cos \theta$. It is to be noted that the magnitude of the detected direct current is not dependent upon the amplitude of the reference wave so long as this is very large in comparison with that of the received pilot wave. It can be made so by use of suitable amplification. Vector addition of the two direct-current outputs involves the summation $(E \sin \theta)^2 + (E \cos \theta)^2 = E^2$ which is seen to be equivalent to power addition.

Figure 2:
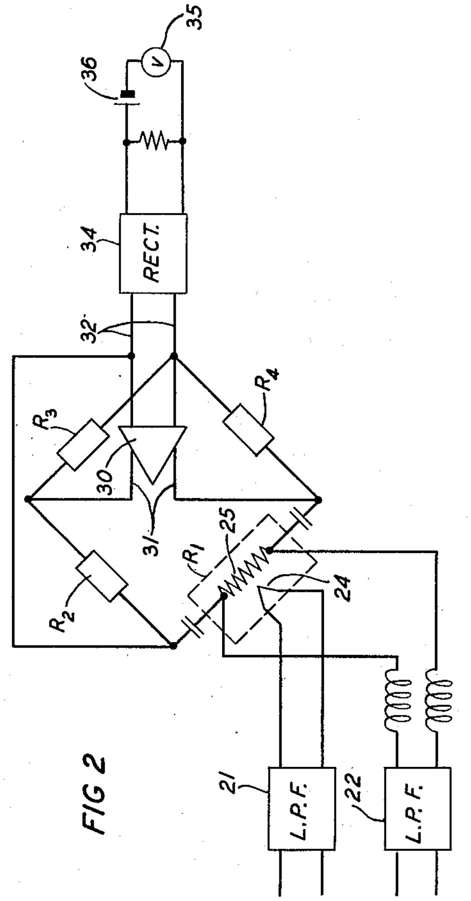

In case it is desired to obtain an output voltage proportional to the amplitude of the received pilot wave, an indicator circuit of the type shown in Fig. 2 may be used. In this circuit a bridge oscillator comprises amplifier element 30 (assumed to include a suitable energizing source) and a feedback connection from its output terminals 31 to its input terminals 32 for causing production of sustained oscillations. The terminals 31 are connected across one diagonal of a bridge having four arms $R_1$, $R_2$, $R_3$ and $R_4$, and terminals 32 are connected across the other bridge diagonal. If the bridge were perfectly balanced, no oscillations would be generated, but the arms are so proportioned as to prevent an exact balance. $R_1$ is the variable arm and determines the degree of unbalance and therefore the amplitude of the generated oscillations.

The two direct-current outputs from low pass filters 21 and 22 (Fig. 1) are respectively applied to thermistor element 25 and heater 24 as in Fig. 1, but in this case the thermistor element forms all or part of bridge arm $R_1$, so that the bridge unbalance is a function of the vector addition of the two direct currents.

The amplitude of oscillations produced by this bridge oscillator, therefore, gives a measure of the amplitude of the received pilot wave. A circuit for indicating the oscillations may be connected to terminals 32 and may comprise rectifier 34, a load resistor connected across the output of the latter, voltmeter 35 and polarity source 36 if it is desired to obtain a reversal of sign of the voltage applied to and measured by the voltmeter 35. By such means a direct voltage measure of the amplitude of the received pilot wave is obtained.

Condensers in arm $R_1$ of the bridge and inductances in the direct-current leads to the thermistor 25 from the output of filter 22 serve to confine the alternating currents generated by the bridge oscillator to the oscillator circuit, and to prevent diversion of direct current away from the element 25. Suitable frequency-determining elements are assumed to be included in the oscillator loop either in the bridge arms or in the amplifier element 30.

By way of illustration, the frequency values for the pilot waves according to one example might be, for $f_1$ to $f_7$, respectively, 8320 kilocycles, 7266 kilocycles, 5202 kilocycles, 3096 kilocycles, 2064 kilocycles, 556 kilocycles and 308 kilocycles. It will be noted that the new pilot frequency 5202 kilocycles is about midway between $f^2$ and $f_4$. Other choices of frequency can, of course, be made, to suit requirements.

The invention is not to be construed as limited to the specific circuits or details disclosed since various modifications may be made without departing from spirit and scope of the invention.

What is claimed is:

1. In a wave transmission system, a transmitting station and a receiving station connected by a wave transmission medium, means at said transmitting station for generating and causing to be transmitted over said medium to the receiving station a plurality of pilot waves of different frequencies, means separately included in the transmitting station and in the receiving station, each for deriving a pilot frequency wave of like frequency by intermodulation of two of said pilot waves of different frequencies, means to transmit the derived wave from said transmitting to said receiving station, means at the receiving station for receiving the wave derived at and transmitted from the transmitting station, means for comparing the said received derived wave with the wave derived at the receiving station to detect changes in amplitude of the received derived wave and means to utilize said amplitude changes to indicate variations in attenuation of the transmission medium between said transmitting and receiving stations.

2. In a wave transmission system, means to transmit through the system a wave of given frequency, means at a point in the system to receive such wave, means at said point to supply another wave of the given frequency, and a circuit for detecting variations in the strength of the received wave comprising a pair of phase-sensitive rectifiers, connections for impressing the received wave on said rectifiers in like phase and for impressing said other wave on said rectifiers in 90-degree displaced phase relation and with an amplitude that is large compared to that of the received wave impressed on said rectifiers, means to add the powers of the direct current outputs of said rectifiers, and means to indicate the magnitude of such power addition.

3. In a wave transmission system, a wave transmission medium, means to transmit a pilot wave of given frequency over said medium from a transmitting point, means at another point in the system for selectively receiving said pilot wave, means to transmit waves of other frequencies over said medium to said other point means at said other point for deriving by interaction between certain of the received waves of said other frequencies another wave of said given frequency, and a comparison circuit for the derived and pilot waves of said given frequency, for indicating variations in strength of the received pilot wave, comprising a pair of modulators, means to apply the derived wave to the inputs of said modulators in 90-degree displaced phase relation and with sufficient amplitude to produce class C operation thereof, means to apply said received pilot wave to the inputs of said modulators in like phase, means to select direct-current outputs from said modulators, and means to add the powers of said outputs.

4. The system of claim 3, including at said other point a wave amplifier for amplifying waves received over said medium, a gain regulator for said amplifier, comprising a power-operated device and in which said means to add the powers of the outputs of the modulators comprises means for separately applying to said power-operated device in additive sense the powers of said outputs to control the gain of said amplifier in accordance with the strength of the received pilot wave and thus in accordance with the variations in attenuation of said medium between said transmitting and said other point.

5. In a transmission system, means to supply at a transmitting point and also as a distant receiving point in the system a pair of waves of identical frequencies, means at the transmitting point to derive a third wave from said pair having a third frequency, means to transmit said third wave through the system, and means at the receiving point for indicating changes in amplitude of said third wave as received thereat comprising a pair of phase sensitive detectors, means to select said third wave and apply it to the inputs of both detectors in like phase, means to derive from the pair of waves supplied at said receiving point a reference wave of said third frequency, means to apply the reference wave to the inputs of both the detectors but with a 90-degree difference of phase and at relatively high amplitude with respect to that of the applied third wave to obtain a direct-current output from each detector, means to filter out the direct current in each output and means to add the powers represented by said direct currents.

6. The system of claim 2, in which said means to add the powers of the direct current outputs of said rectifiers comprises an oscillation generator having a feedback loop including a four-arm bridge circuit, the impedance of one arm of said bridge circuit determining the amount of feedback and thus the amplitude of the generated oscillations, variable impedance means including a thermistor in said one arm of said bridge circuit, means for causing said thermistor to be indirectly heated by the direct current output of one of said rectifiers and to be directly heated by the direct current output of the other rectifier, and said means to indicate the magnitude of such power addition comprises rectifying means having its input connected across one diagonal of said bridge circuit, for rectifying the unbalance current of said bridge circuit caused by the variations in the impedance of said thermistor due to the direct and indirect heating thereof, and metering means connected across the output of said rectifying means.

References Cited in the file of this patent

UNITED STATES PATENTS

| Number | Name | Date |
|---|---|---|
| 2,558,886 | Taylor et al. | July 3, 1951 |
| 2,565,922 | Howard | Aug. 28, 1951 |
| 2,592,750 | Selove | Apr. 15, 1952 |
| 2,613,279 | Hurault | Oct. 7, 1952 |